United States Patent
Bisnack

(10) Patent No.: US 7,861,464 B2
(45) Date of Patent: Jan. 4, 2011

(54) VEHICLE WINDOW GLASS DRIP MANAGEMENT

(75) Inventor: William C. Bisnack, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 173 days.

(21) Appl. No.: 12/365,193

(22) Filed: Feb. 4, 2009

(65) Prior Publication Data

US 2010/0194150 A1 Aug. 5, 2010

(51) Int. Cl.
*B60J 5/04* (2006.01)

(52) U.S. Cl. .............................. 49/502; 49/375; 49/349

(58) Field of Classification Search ................... 49/348, 49/349, 374, 375, 502
See application file for complete search history.

(56) References Cited

U.S. PATENT DOCUMENTS

| | | | | |
|---|---|---|---|---|
| 3,050,332 A * | 8/1962 | Arnold, Jr. | ................... | 49/227 |
| 4,615,143 A * | 10/1986 | Isetani | ......................... | 49/374 |
| 4,669,221 A * | 6/1987 | Ugawa et al. | .................. | 49/352 |
| 4,776,132 A * | 10/1988 | Gold | ............................ | 49/375 |
| 4,962,601 A * | 10/1990 | Gold | ............................ | 49/374 |
| 6,330,764 B1 * | 12/2001 | Klosterman | ................... | 49/375 |
| 2001/0025456 A1 * | 10/2001 | Furuyama et al. | .............. | 49/502 |
| 2005/0274079 A1 * | 12/2005 | Chim | .......................... | 49/375 |
| 2007/0294951 A1 * | 12/2007 | Tenorio et al. | ................ | 49/375 |
| 2008/0086949 A1 * | 4/2008 | Shimura et al. | ............... | 49/374 |
| 2009/0000202 A1 * | 1/2009 | Eckhardt et al. | .............. | 49/352 |

FOREIGN PATENT DOCUMENTS

JP       03017374 A  *  1/1991

* cited by examiner

*Primary Examiner*—Jerry Redman

(57) ABSTRACT

A vehicle window glass mounted in a vehicle component and movable to open and close a window is disclosed. The window glass may comprise a generally vertical first side edge; a generally vertical second side edge in opposed relation to the first side edge; and a bottom edge extending between the first side edge and the second side edge and including a first downward sloping portion extending from the first side edge in a downward sloping direction and a first drip notch recessed into the bottom edge along the first downward sloping portion, whereby water wicking along the first downward sloping portion of the bottom edge will drop from the window glass when the water makes contact with the first drip notch.

10 Claims, 1 Drawing Sheet

VEHICLE WINDOW GLASS DRIP MANAGEMENT

BACKGROUND OF INVENTION

The present invention relates generally to vehicle windows and in particular to controlling water flow from movable windows in vehicles.

For movable windows in vehicles, it is common for water to sometimes migrate past the window seals and then flow down along the glass into the interior of the door (or body as the case may be). The water that migrates inside the door may then drip off the glass onto window (and door) hardware. Typically, most of the water enters the door at the forward and rearward edges of the window glass, travels down the vertical glass edge, and then drops indiscriminately onto the window and door hardware (latches, regulator motors, etc.). Water dripping onto certain components may lead to premature failure due to corrosion or other water induced problems.

One way to combat this concern is to extend the bottom of the window glass downward near the forward and rear edges of the glass so the bottom edge of the glass gradually slopes downward toward both ends. This design attempts to keep the water along the front and rear edges of the glass and have the water drip from the front and rear edges. However, for some doors, a door check link or latch may be right under the vertical glass edge, so water would then drip off the glass at an undesirable location. Moreover, this solution adds to the weight of the window glass and may be difficult to accomplish due to space limitations when packaging the window glass in the door.

Other methods employed to combat the water migration concern and overcome the drawbacks of the glass extensions also have limited success. For example, C-shaped clips are sometimes bonded to the lower edge of the window glass to create a drip location. But these add cost, weight and assembly steps to the window/door assembly. Others have tried C-shaped sashes that run along the bottom of the window glass and attempt to act as a water barrier, but the sashes are not very effective in determining where the water will drip off and again add cost, weight and assembly time to the door/window assembly. Still another method is to glue a dam—a long extruded rubber strip shaped like a lip—along a side of the glass just above the bottom edge of the glass in order to try and divert the water drip to a desired location. Again, though, this adds cost, weight and assembly steps.

SUMMARY OF INVENTION

An embodiment contemplates a vehicle window glass mounted in a vehicle component and movable to open and close a window. The window glass may comprise a generally vertical first side edge; a generally vertical second side edge in opposed relation to the first side edge; and a bottom edge extending between the first side edge and the second side edge and including a first downward sloping portion extending from the first side edge in a downward sloping direction and a first drip notch recessed into the bottom edge along the first downward sloping portion, whereby water wicking along the first downward sloping portion of the bottom edge will drop from the window glass when the water makes contact with the first drip notch.

An advantage of an embodiment is that the location of water dripping from a movable window glass will be controlled, thus minimizing water dripping onto hardware that might suffer damage due to long term exposure to the water. Moreover, the water flow control is achieved with minimal cost and without adding weight or parts to the window glass or window assembly.

DETAILED DESCRIPTION

Figure 1:
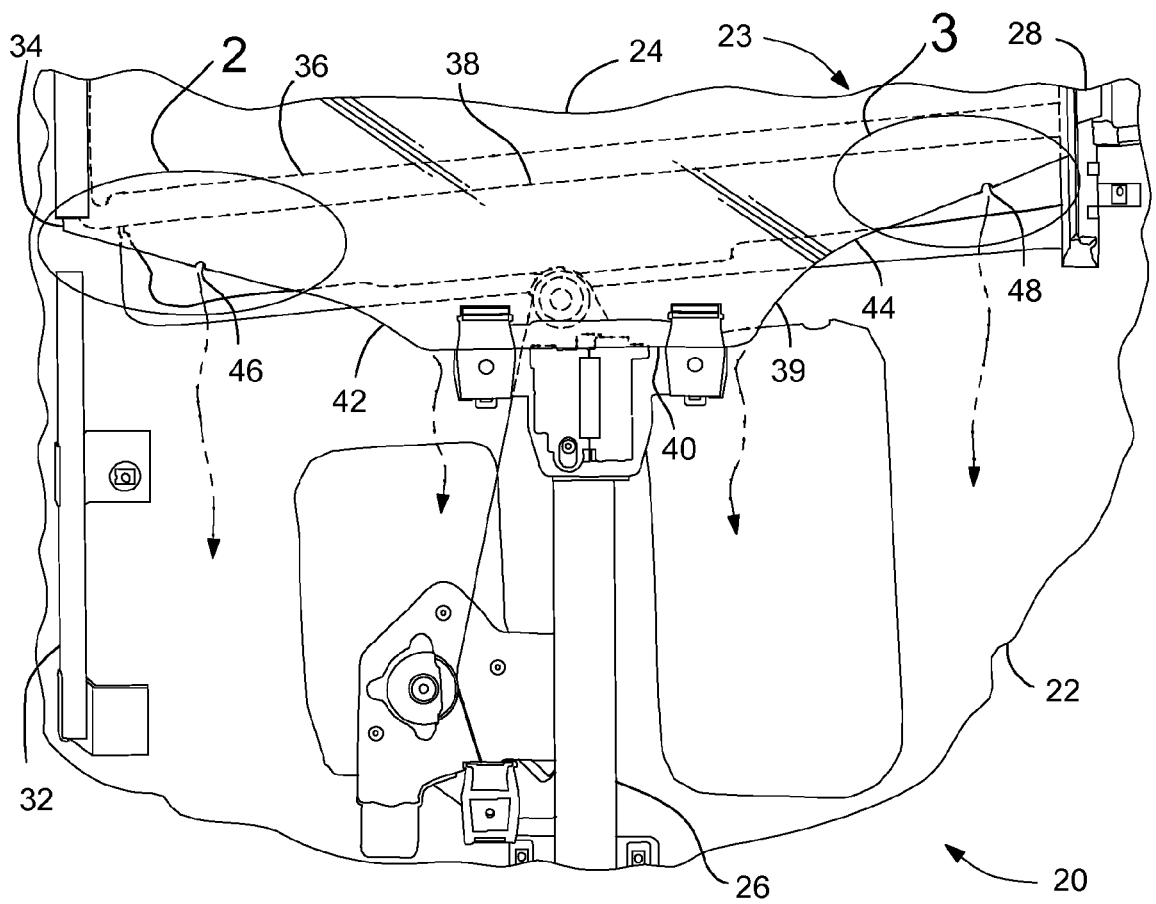
FIG. 1 is an elevation view of a portion of a vehicle door.
Figure 2:
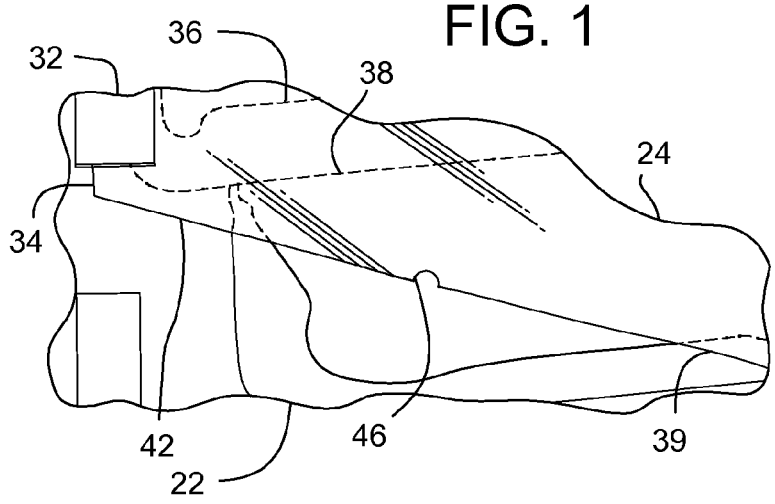
FIG. 2 is a view, on an enlarged scale, of encircled area 2 in FIG. 1.
Figure 3:
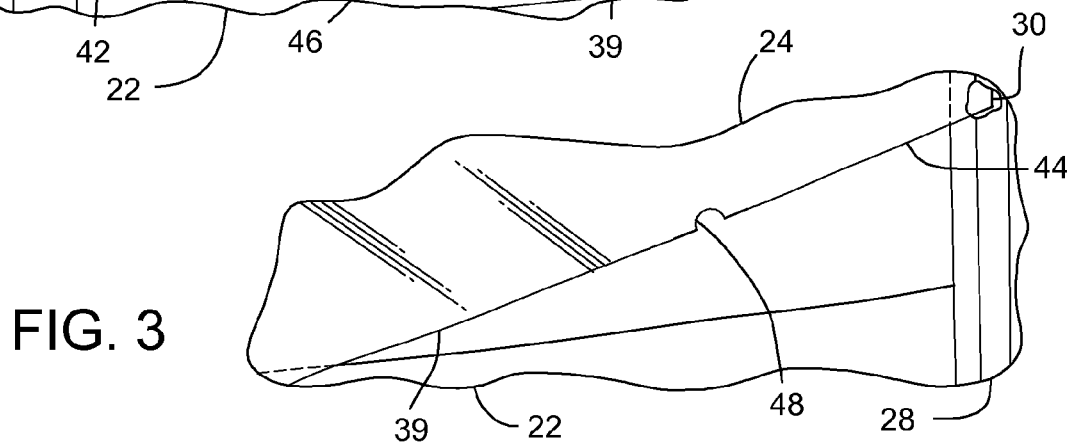
FIG. 3 is a view, on an enlarged scale, of encircled area 3 in FIG. 1.

Referring to FIGS. 1-3, a portion of a vehicle door, indicated generally at 20, is shown. The vehicle door 20 includes a door inner panel 22 and a window assembly 23. The window assembly 23 includes a movable window glass 24 and a window regulator 26 that controls the up and down movement of the window glass 24. When referring to glass herein, this may include other types materials for movable windows in vehicles, including plastics and layers of different materials used for the window. While the window glass 24 is shown in a side door of a vehicle, the window glass 24 may be used anywhere movable glass is used on a vehicle, such as sliding doors, lift-gates, mid-gates, dropping backlights, or other similar types of locations.

A rear glass run channel 28 retains and guides a rear side edge 30 of the window glass 24, and a front glass run channel 32 retains and guides a front side edge 34 of the window glass 24. The front glass run channel 32 may include both a portion below a door belt line 36 and a portion above the door belt line 36. A door belt line seal 38 may extend along the belt line 36 to minimize water intrusion into the door 20.

The window glass 24 includes a bottom edge 39 that has a central portion 40 that may be generally horizontal, a front downward sloping portion 42 that slopes downward from the front side edge 34 to the central portion 40, and a rear downward sloping portion 44 that slopes downward from the rear side edge 30 to the central portion 40.

A forward drip notch 46 is located along the front downward sloping portion 42, and a rear drip notch 48 is located along the rear downward sloping portion 44. The drip notches 46, 48 are preferably located above areas in the door where dripping water will not fall onto door hardware that may be damaged over time by water. Each of the drip notches 46, 48 is an arcuate shaped recess in the bottom edge 39 of the window glass 24. Each drip notch 46, 48, for example, may have a diameter of about 12.5 millimeters. Although, other diameters and shapes may be employed so long as the drip notches 46, 48 create a sufficient discontinuity to cause water running down the downward sloping portions 42, 44 to separate from the window glass 24. The drip notches 46, 48 may be created in the window glass 24 during the glass making process. For example, the notches 46, 48 can be added before tempering the window glass 24 by using a cylindrical grinding rod applied generally perpendicular to the bottom edge 39 of the glass 24. This grinding can be accomplished during the typical glass edge grinding process that is used to smooth the edges of the window glass 24.

During vehicle use, when the vehicle door 20 is exposed to water, some of the water wicks or migrates past the seals, such as the belt line seal 38, and travels along the face of the glass 24 or along the front or rear edges 30, 34 of the glass 24, with most water typically entering the door 20 at the forward and rearward edges 30, 34. The water, due to gravity, makes its way to the bottom edge 39 of the window glass 24.

Water coming down the front side edge 34 then tends to travel along the front downward sloping portion 42 until it reaches the forward drip notch 46. At this point, the water wicking along the bottom edge 39 of the window glass 24 will tend to drop off at the forward drip notch 46 (water drips indicated by phantom arrows in FIG. 1). Since the forward drip notch 46 is located to avoid dripping water onto door hardware that may be damaged by exposure to water over time, the door components are better protected and less likely to have operating concerns. Some small amounts traveling along the surface of the window glass 24 may also drop where the front downward sloping portion 42 meets the central portion 40 of the bottom edge 39. This may be addressed by careful determination of this location or maybe even a second forward drip notch (not shown) at a desired location.

As with the front side edge 34, water wicking along the rear side edge 30 will tend to continue wicking along the rear downward sloping portion 44 until it reaches the rear drip notch 48. The water will then drip from the widow glass 24 at the rear drip notch 48 rather than continue to travel down the bottom edge 39 of the window glass 24. Again, the location of the drip notch 48 is such that the dripping water will avoid falling onto door hardware that might by damaged by water intrusion.

While certain embodiments of the present invention have been described in detail, those familiar with the art to which this invention relates will recognize various alternative designs and embodiments for practicing the invention as defined by the following claims.

What is claimed is:

1. A vehicle window glass mounted in a vehicle component and movable to open and close a window, the window glass comprising:
   a generally vertical first side edge;
   a generally vertical second side edge in opposed relation to the first side edge; and
   a bottom edge extending between the first side edge and the second side edge and including a first downward sloping portion extending from the first side edge in a downward sloping direction and a first drip notch recessed into the bottom edge along the first downward sloping portion, whereby water wicking along the first downward sloping portion of the bottom edge will drop from the window glass when the water makes contact with the first drip notch.

2. The vehicle window glass of claim 1 wherein the bottom edge includes a second downward sloping portion extending from the second side edge in a downward sloping direction and a second drip notch recessed into the bottom edge along the second downward sloping portion, whereby water wicking along the second downward sloping portion of the bottom edge will drop from the window glass when the water makes contact with the second drip notch.

3. The vehicle window glass of claim 2 wherein the bottom edge includes a generally horizontal central portion extending between the first downward sloping portion and the second downward sloping portion.

4. The vehicle window glass of claim 1 wherein the first drip notch has an arcuate portion having a diameter of 12 to 13 millimeters.

5. The vehicle window glass of claim 1 wherein the vehicle component is a door and the window glass is configured to slide up and down in the door.

6. A window assembly for use in a vehicle component and movable between an open and a closed position, the window assembly comprising:
   a window glass including a generally vertical first side edge; a generally vertical second side edge in opposed relation to the first side edge; and a bottom edge extending between the first side edge and the second side edge and including a first downward sloping portion extending from the first side edge in a downward sloping direction and a first drip notch recessed into the bottom edge along the first downward sloping portion, whereby water wicking along the first downward sloping portion of the bottom edge will drop from the window glass when the water makes contact with the first drip notch;
   a first glass run channel that receives and guides the first side edge;
   a second glass run channel that receives and guides the second side edge; and
   a window regulator mounted to the window glass and configured to move the glass between the open and closed positions.

7. The window assembly of claim 6 wherein the bottom edge includes a second downward sloping portion extending from the second side edge in a downward sloping direction and a second drip notch recessed into the bottom edge along the second downward sloping portion, whereby water wicking along the second downward sloping portion of the bottom edge will drop from the window glass when the water makes contact with the second drip notch.

8. The window assembly of claim 7 wherein the bottom edge includes a generally horizontal central portion extending between the first downward sloping portion and the second downward sloping portion, and the window regulator is mounted to the central portion.

9. The window assembly of claim 6 wherein the first drip notch has an arcuate portion having a diameter of 12 to 13 millimeters.

10. The window assembly of claim 6 wherein the vehicle component is a door having a door inner panel, and the window regulator, the first glass run channel and the second glass run channel are mounted to the door inner panel.

* * * * *